(12) United States Patent
Yagi

(10) Patent No.: US 6,465,932 B2
(45) Date of Patent: Oct. 15, 2002

(54) METHOD AND APPARATUS FOR CONTROLLING PIEZOELECTRIC VIBRATORY PARTS FEEDER

(75) Inventor: Susumu Yagi, Toyama-ken (JP)

(73) Assignee: YKK Corporation, Tokyo (JP)

(*) Notice: Subject to any disclaimer, the term of this patent is extended or adjusted under 35 U.S.C. 154(b) by 0 days.

(21) Appl. No.: 09/920,406

(22) Filed: Aug. 2, 2001

(65) Prior Publication Data

US 2002/0024268 A1 Feb. 28, 2002

(30) Foreign Application Priority Data

Aug. 11, 2000 (JP) ........................................ 2000-244147

(51) Int. Cl.$^7$ .............................................. H01L 41/08
(52) U.S. Cl. ............. 310/317; 310/316.01; 310/323.01; 310/328; 198/162; 198/756
(58) Field of Search .................. 310/316.01, 316.02, 310/317, 323.01, 328; 198/162, 756

(56) References Cited

U.S. PATENT DOCUMENTS 5,472,079 A 12/1995 Yagi et al.
5,910,698 A 6/1999 Yagi

*Primary Examiner*—Mark O. Budd
(74) *Attorney, Agent, or Firm*—Finnegan, Henderson, Farabow, Garrett & Dunner, L.L.P.

(57) ABSTRACT

An apparatus for controlling a piezoelectric vibratory parts feeder comprises a piezoelectric vibrating unit provided with a piezoelectric vibrating element that vibrates at a predetermined frequency, a bowl adapted to discharge parts accommodated therein by means of the piezoelectric vibrating unit, a driving circuit for driving the piezoelectric vibrating element, and a control unit for outputting a driving signal to the driving circuit to cause a predetermined driving. The control is performed by idling the driving of the piezoelectric vibrating element temporarily at every predetermined driving cycles thereof and controlling the vibration of the piezoelectric vibrating element based on a signal obtained therefrom by its piezoelectric effect during the idling period, for instance, based on a phase difference between a waveform of this signal and the driving signal of the driving circuit.

9 Claims, 5 Drawing Sheets

# METHOD AND APPARATUS FOR CONTROLLING PIEZOELECTRIC VIBRATORY PARTS FEEDER

BACKGROUND OF THE INVENTION

1. Field of the Invention

This invention relates to a method of and an apparatus for controlling a piezoelectric vibratory parts feeder which feeds various types of parts by vibration of a piezoelectric vibrating element.

2. Description of the Prior Art

A typical example of the conventional piezoelectric vibratory parts feeders comprises, as shown in FIG. 1, a bowl 2 adapted to accommodate therein a large number of parts for supply and discharge the parts while exerting vibration to the bowl, a vibrating unit 4 provided with a piezoelectric vibrating element for driving the bowl 2 at a predetermined resonance frequency, and a piezoelectric driving control system 5 for driving the vibrating unit 4. This piezoelectric vibratory parts feeder is adapted to electrically detect a vibration amplitude of the bowl 2 by an amplitude sensors 6 such as, for example, a photoelectric transducer and a piezoelectric element, feed it back to the piezoelectric driving control system 5, and control the electric current or voltage for driving the bowl 2 to drive the bowl at a constant amplitude at any time.

Since this method requires the amplitude sensor 6 to detect the vibration of the bowl 2, the construction of the system becomes complicated, the number of components increases, and also the cost becomes high.

Another system is proposed, as disclosed in Japanese Patent Applications, KOKAI (Early Publication) No. JP,7-60187,A and No. JP,10-49237,A, to perform predetermined operation or processing based on a signal obtained from an electric current detector or a voltage detector connected to a driving circuit, thereby controlling the driving signal of the driving circuit of a piezoelectric vibrating element without using a special amplitude sensor.

Although it is not necessary to provide a special amplitude sensor in the case of this method, it requires controlling of additional operation, processing, etc. in order to detect the current value or the like at the time of driving thereby controlling the vibration of the vibrating unit 4. Consequently, a control system becomes complicated with size of the apparatus increased, and also the cost becomes high.

SUMMARY OF THE INVENTION

An object of the present invention is, therefore, to provide a method of and an apparatus for controlling a piezoelectric vibratory parts feeder with simple construction and enabling accurate vibration.

In accordance with one aspect of the present invention, there is provided a method of controlling a piezoelectric vibratory parts feeder which comprises a piezoelectric vibrating unit provided with a piezoelectric vibrating element that vibrates at a predetermined frequency, a bowl adapted to discharge parts accommodated therein by means of the piezoelectric vibrating unit, a driving circuit for driving the piezoelectric vibrating element, and a control unit for outputting a driving signal to the driving circuit to cause a predetermined driving. The method comprises idling the driving of the piezoelectric vibrating element temporarily at every predetermined driving cycles of the piezoelectric vibrating element and controlling vibration of the piezoelectric vibrating element based on a signal obtained from the piezoelectric vibrating element mentioned above by its piezoelectric effect during the idling period, for instance, based on a phase difference between a waveform of this signal and the driving signal of the driving circuit mentioned above.

In a preferred embodiment, a resonance frequency of the piezoelectric vibratory parts feeder is previously measured before it is controlled. When the measurement of the resonance frequency is made, the piezoelectric vibrating element is driven by the driving circuit mentioned above, the driving by the driving circuit is temporarily idled at every predetermined driving cycles, and the signal obtained from the piezoelectric vibrating element by its piezoelectric effect is measured during the idling period. The frequency at which the signal becomes maximum is assumed as a resonance frequency. Then, the piezoelectric vibrating element is driven by the driving circuit at the obtained resonance frequency, and the driving by the driving circuit is temporarily idled at every predetermined driving cycles. During the idling period, a signal obtained from the piezoelectric vibrating element by its piezoelectric effect, a phase difference between a waveform of this signal and the driving signal of the driving circuit mentioned above, and the resonance frequency mentioned above are stored in a storage element. When the piezoelectric vibrating unit is driven, it is driven at the resonance frequency stored. Furthermore, the control of the piezoelectric vibrating element is carried out in such a way that the phase difference between the waveform of the signal obtained by the piezoelectric effect and the driving signal of the driving circuit becomes equal to the stored phase difference mentioned above.

In accordance with a second aspect of the present invention, there is provided a system for controlling a piezoelectric vibratory parts feeder. This system comprises a piezoelectric vibrating unit provided with a piezoelectric vibrating element that vibrates at a predetermined frequency, a bowl adapted to discharge parts accommodated therein by means of the piezoelectric vibrating unit, a driving circuit for driving the piezoelectric vibrating element, a control unit for outputting a driving signal to the driving circuit to cause a predetermined driving and temporarily idling the driving of the piezoelectric vibrating element at every predetermined driving cycles of the piezoelectric vibrating element, a signal detecting means for detecting a waveform of a signal obtained from the piezoelectric vibrating element by its piezoelectric effect during the idling period, a phase difference detecting means for detecting a phase difference between the waveform of the signal obtained by the signal detecting means and the driving signal waveform of the driving circuit, and a vibration controlling means for controlling vibration of the piezoelectric vibrating element based on the phase difference obtained by the phase difference detecting means.

In this specification, the signal mentioned above indicates a voltage or an electric current. When the signal indicates a voltage, the term "signal" involves a voltage waveform, a driving voltage, a voltage detecting means, and a driving voltage waveform. When the signal is an electric current, it involves a current waveform, a driving current, a current detecting means, and a driving current waveform.

The method of and the apparatus for controlling the piezoelectric vibratory parts feeder as constructed above are capable of accurately detecting the vibration by utilizing the piezoelectric vibrating element itself as a sensor, without using a special amplitude sensor that detects the amplitude of the piezoelectric vibrating unit, so that the construction thereof can be remarkably simplified. Moreover, since the resonance frequency of the parts feeder is once measured and stored and the parts feeder is operated based on the stored resonance frequency and other signals or the data of phase difference, it is possible to drive the parts feeders on their respective optimal driving conditions. Since the resonance frequency can be measured again even when the construction of the parts feeder is changed, it is possible to drive the parts feeder always at suitable conditions.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

Figure 1:
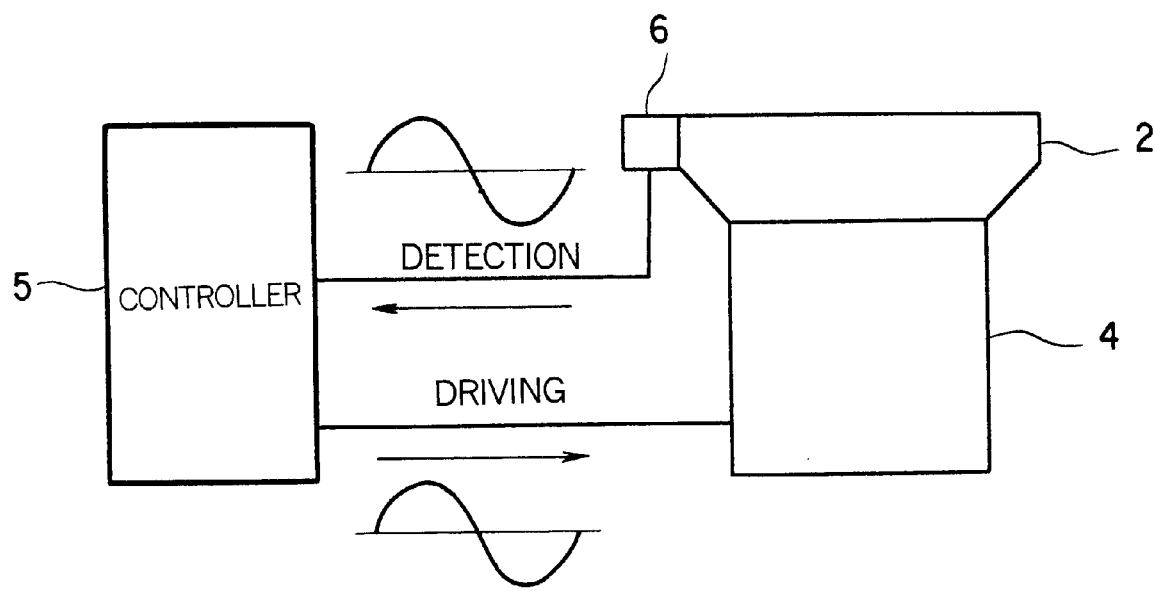
FIG. 1 is an schematic view showing a method of controlling a conventional parts feeder.
Figure 2:
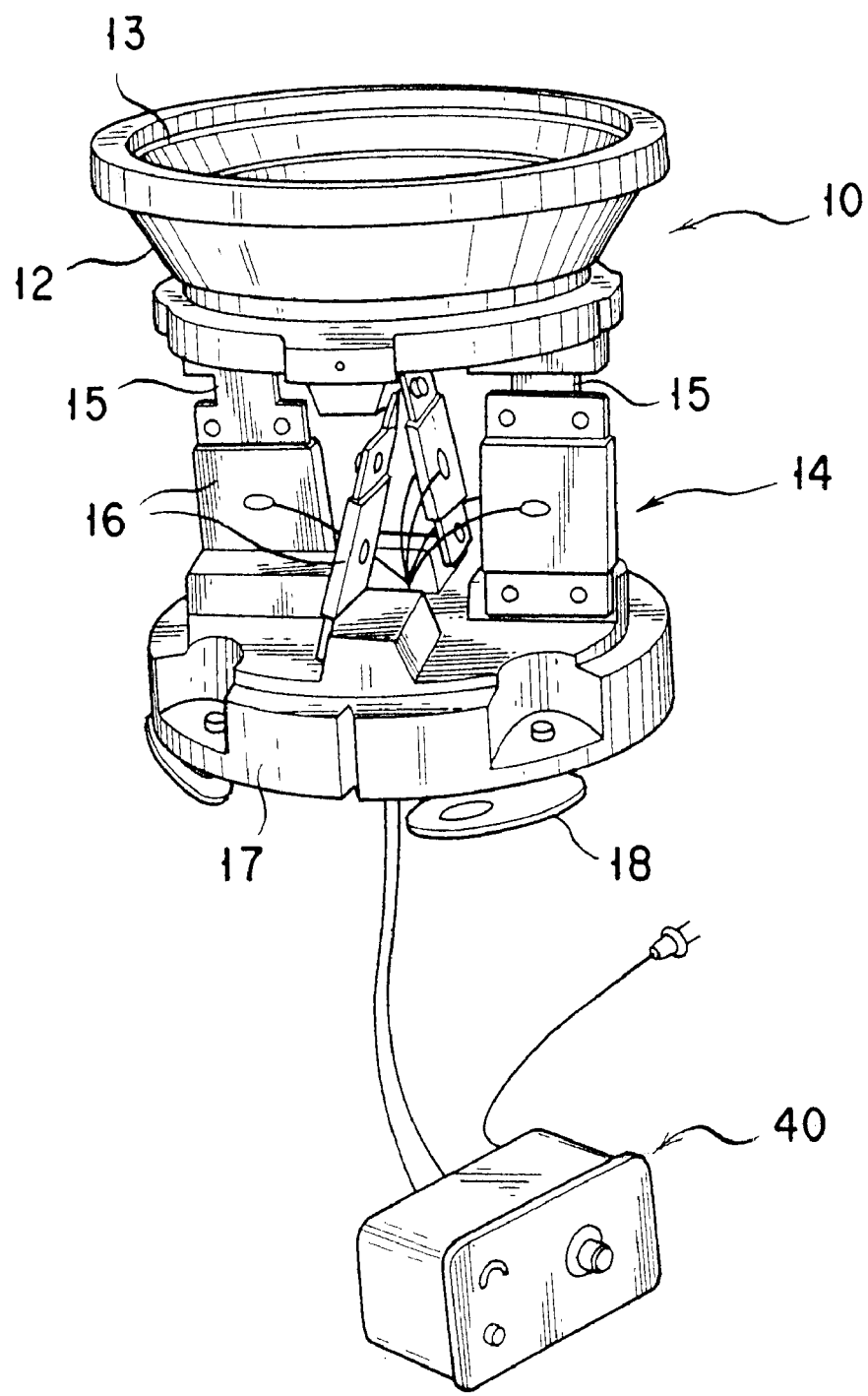
FIG. 2 is a diagramatical perspective view illustrating a conventional piezoelectric vibratory parts feeder incorporating therein a control system according to the present invention.

Referring to the drawings, FIG. 2 illustrates an embodiment of a piezoelectric vibratory parts feeder 10 provided with a control apparatus 40 according to the present invention. The parts feeder is substantially the same in construction as the conventional parts feeder. Briefly stated, the parts feeder 10 comprises a bowl 12 provided with a side wall having a spiral parts feed track 13 formed on the inner peripheral surface thereof in the form of the gently upwardly sloping surface and a plurality of plate springs 15 functioning as elastic supporting means and attached at their upper ends to the underside of the bowl 12 with a predetermined angle formed therebetween. The lower ends of the respective plate springs 15 are directly connected to the upper ends of the corresponding piezoelectric vibrating elements 16. The lower ends of the piezoelectric vibrating elements 16 are secured to a base portion 17 at the same angle as the upper ends thereof. The piezoelectric vibrating elements 16 oscillate or vibrate when an electric power form a power supply is intermittently supplied to the piezoelectric vibrating elements 16. The oscillation or vibration of the piezoelectric vibrating elements 16 is transmitted via the plate springs 15 to the bowl 12 of the parts feeder 10. The base portion 17 is fixedly mounted on the floor surface via cushioning or damping members 18. The piezoelectric vibrating elements 16 jointly form a main portion of a piezoelectric vibrating unit 14 for vibrating the bowl 12. The operation of the parts feeder is described, for example, in U.S. Pat. No. 5,472,079 issued Dec. 5, 1995 to Yagi et al., the teachings of which are hereby incorporated by reference.

Figure 3:
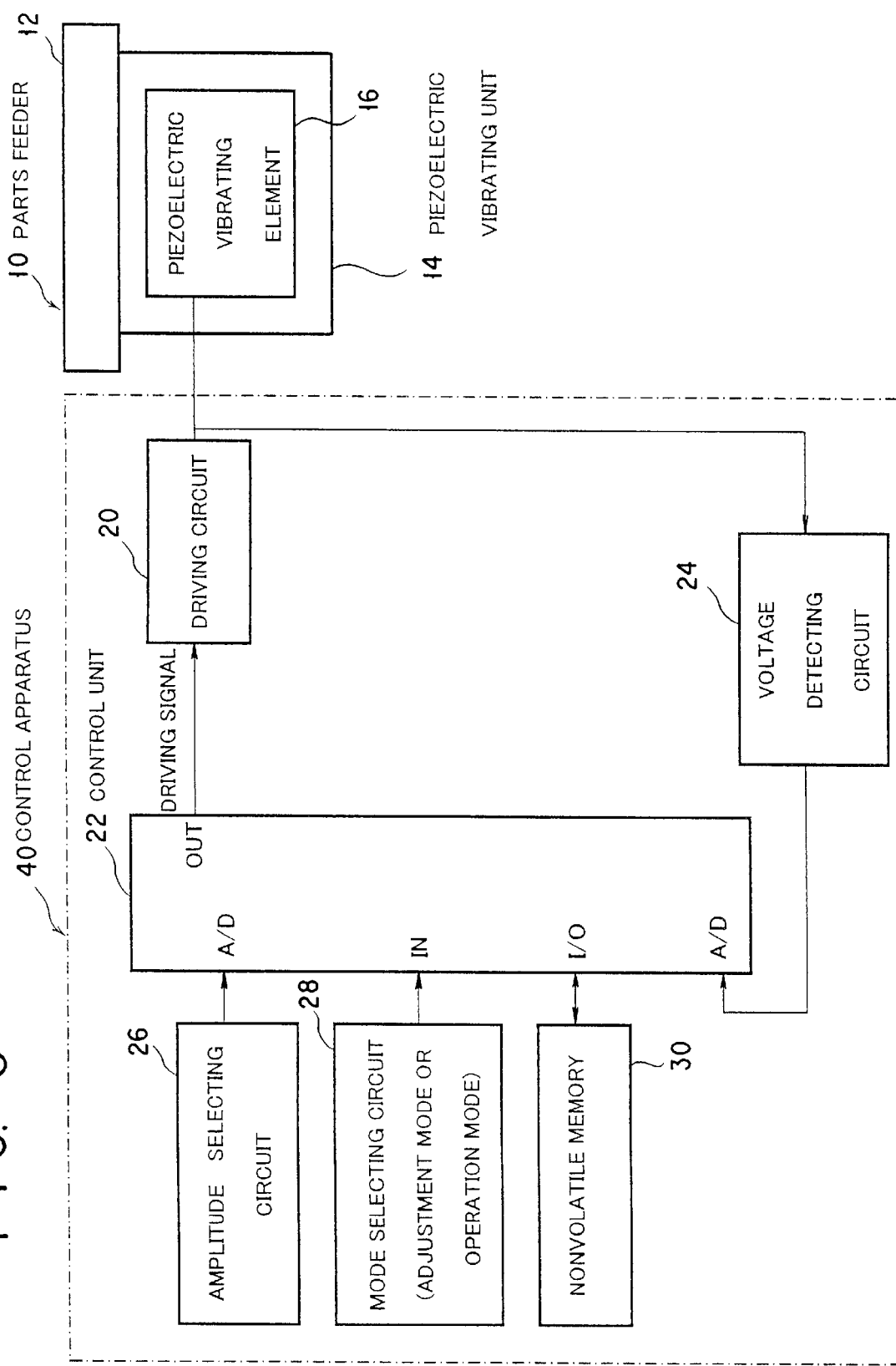
FIG. 3 is a schematic block diagram of a control system of a piezoelectric vibratory parts feeder according to one embodiment of the present invention.

Now, the control apparatus 40 for driving the piezoelectric vibrating elements 16 is explained below with reference to FIG. 3. Each of the piezoelectric vibrating elements 16 is connected to a driving circuit 20 comprising an electric power amplifier etc., and the driving circuit 20 is connected to a control unit 22 comprising a microcomputer which outputs a driving signal for the piezoelectric vibrating element 16. Further, the piezoelectric vibrating element 16 is connected to a voltage detecting circuit 24 for detecting a voltage generated in the electrode of the piezoelectric vibrating element, and an output terminal of the voltage detecting circuit 24 is connected to an input terminal of an A/D converter of the control unit 22.

To the control unit 22, an amplitude setting circuit 26 for adjusting an amplitude of the piezoelectric vibrating element 16 through the medium of the driving circuit 20 is connected. Besides, a mode setting circuit 28 for shifting the driving mode of the parts feeder 10 from an adjustment mode to an operation mode and vice versa is connected to the control unit 22. Further, the control unit is provided with a storage element 30, such as a nonvolatile memory, for storing data such as a predetermined voltage value, a phase difference, and a frequency and for outputting the data to the control unit 22 and inputting the data therefrom.

Figure 4:
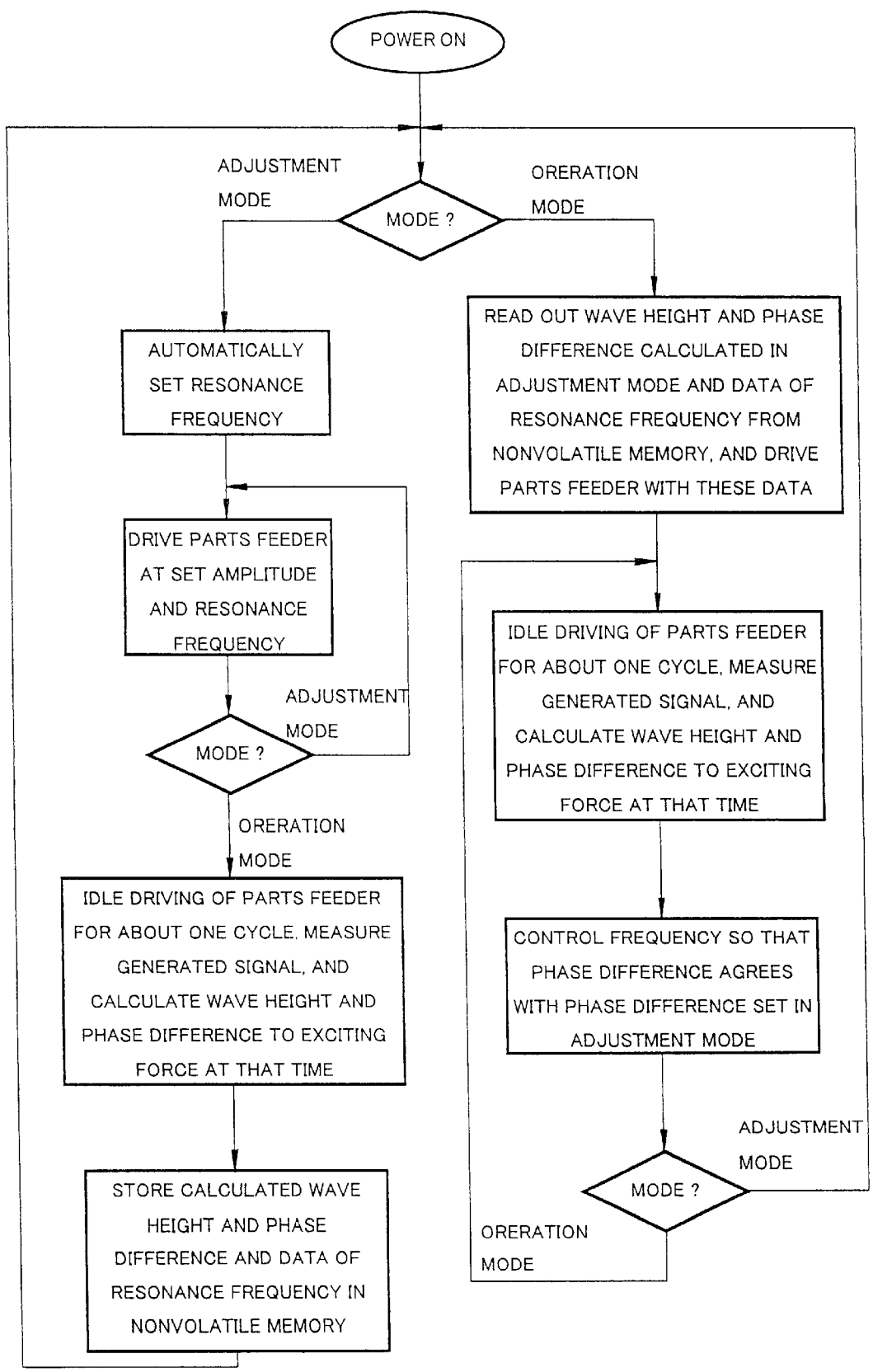
FIG. 4 is a flow chart showing the control sequence of the piezoelectric vibratory parts feeder according to the embodiment mentioned above.
Figure 5:
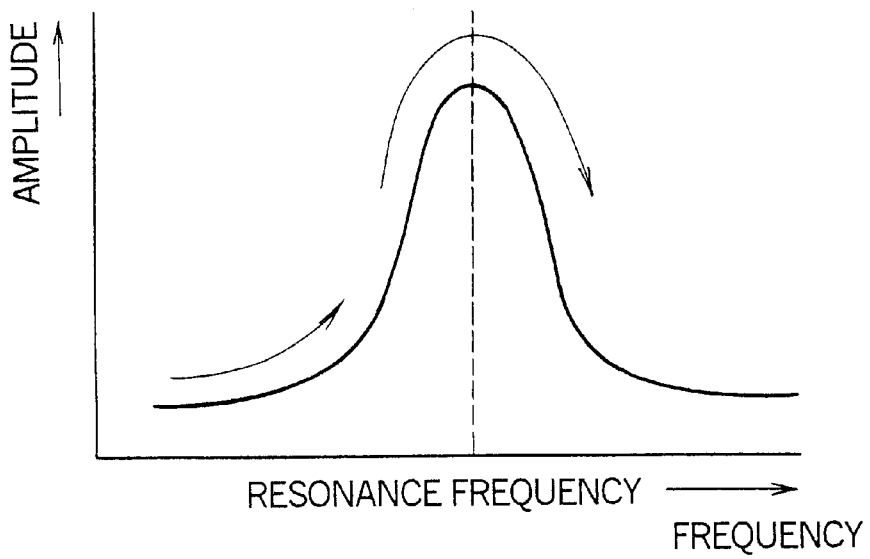
FIG. 5 is graph showing the relation between a resonance frequency and an amplitude of the piezoelectric vibratory parts feeder according to the embodiment mentioned above.
Figure 6:
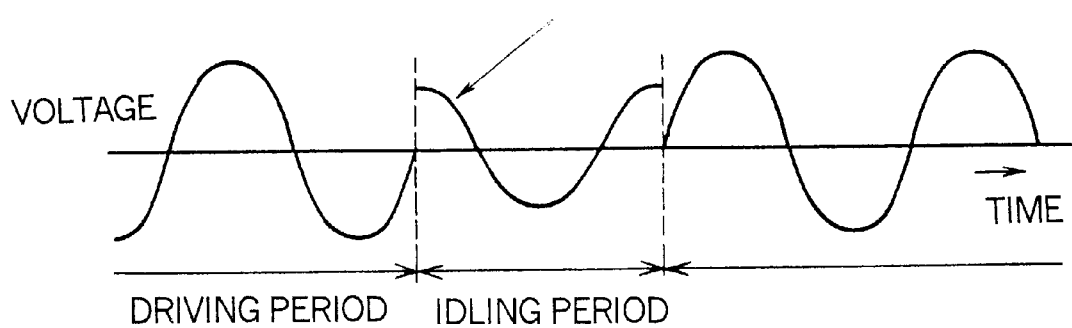
FIG. 6 is graph showing a driving waveform of the piezoelectric vibratory parts feeder according to the embodiment mentioned above.

The driving method and the controlling method of the piezoelectric vibratory parts feeder 10 of this embodiment are as follows. First, as shown in FIG. 4 through FIG. 6, a power supply is switched on and the driving mode of the piezoelectric vibratory parts feeder 10 is selected by the mode setting circuit 28. Usually, a resonance frequency of the piezoelectric vibratory parts feeder 10 is measured and stored therein at the time of shipment of the piezoelectric vibratory parts feeder 10. Further, since the resonance frequency changes when the natural frequency of the vibration system is changed by exchanging the bowl 12 or other component part thereof for another, the resonance frequency is measured under the adjustment mode and stored therein.

Since an amplitude becomes maximum at the resonance frequency in the piezoelectric vibrating unit 14, as shown in FIG. 5, its frequency is swept without changing a driving voltage, and the frequency at which the amplitude becomes maximum is assumed as the resonance frequency. In the measurement of the resonance frequency, the piezoelectric vibrating element 16 is driven by the driving circuit 20, the driving by the driving circuit 20 is temporarily idled at every predetermined driving cycles, and a voltage obtained by the piezoelectric effect of the piezoelectric vibrating element 16 is measured during the idling period. The frequency at which the voltage becomes maximum is assumed as the resonance frequency. This operation for measuring the resonance frequency is performed automatically according to a predetermined program. The amplitude of the piezoelectric vibrating unit 14 when driven at the resonance frequency is set by the amplitude setting circuit 26.

Next, the driving mode is switched to the operation mode by the mode setting circuit 28. The piezoelectric vibrating element 16 is driven by the driving circuit 20 with the resonance frequency and amplitude set and, as shown in FIG. 6, the driving by the driving circuit 20 is idled temporarily for a period of one cycle or 1.5 cycles, for example, at every predetermined cycles, for example, 50 cycles. A voltage obtained from the piezoelectric vibrating element 16 by its piezoelectric effect during the idling period is detected by the voltage detecting circuit 24 and outputted to the control unit 22. In the control unit 22, A/D conversion of the voltage waveform obtained by the voltage detecting circuit 24 is performed and a phase difference between this voltage waveform and a waveform of a driving signal for driving the driving circuit 20 and serving as the exciting force is calculated. Furthermore, the above resonance frequency, the wave height of the voltage waveform at that frequency, and the above-mentioned phase difference are stored in a storage element 30.

Then, in the operation of the piezoelectric vibratory parts feeder 10 the mode is set at the operation mode by the mode setting circuit 28. The wave height of the driving voltage and the resonance frequency stored in the storage element 30 during the adjustment mode are read out and the control unit 22 drives the piezoelectric vibrating element 16 with these values through the medium of the driving circuit 20. During this mode, the driving by the driving circuit 20 is idled temporarily for a period of one cycle or 1.5 cycles, for example, at every predetermined cycles, for example, 50 cycles. The piezoelectric vibrating element 16 generates a voltage by its piezoelectric effect during this idling period, and this voltage is detected by the voltage detecting circuit 24 and outputted to the control unit 22. In the control unit 22, A/D conversion of the voltage waveform obtained by the voltage detecting circuit 24 is performed, and a phase difference between this voltage waveform and a waveform of the driving signal as the exciting force for driving the driving circuit 20 is calculated. And a vibrating frequency of the piezoelectric vibrating element 16 is controlled in such a way that the phase difference between the voltage waveform obtained from the piezoelectric vibrating element 16 and the driving voltage of the driving circuit 20 becomes equal to the above-mentioned phase difference stored during the adjustment mode. This control is continued during operation of the piezoelectric vibratory parts feeder 10.

According to the method and apparatus for controlling the piezoelectric vibratory parts feeder of this embodiment, the mechanical vibration of the piezoelectric vibrating element 16 is detected by the piezoelectric vibrating element 16 itself owing to the temporary pause of driving voltage and converted into an electric signal, and the detected signal is sent to the control unit 22. It is therefore possible to perform the amplitude detection and drive control accurately, without using the special sensor for detecting the amplitude. Further, since the piezoelectric vibrating element 16 itself serves as a sensor, the construction is simple and the detected signal is very accurate. Moreover, there is no problem in the driving of the piezoelectric vibrating unit 14 because it vibrates by inertia even if the driving of the piezoelectric vibrating element 16 is temporarily idled.

Further, since the adjustment mode and the operation mode are interchangeable and in the adjustment mode the parts feeder 10 can be adjusted to the optimal resonance frequency as required. Therefore, the parts feeder can always be driven in an appropriate state.

Incidentally, in a case where the parts feeder is of a self-excited vibration type, an accurate vibration can be attained if a frequency is controlled so that the phase of the voltage obtained from the piezoelectric vibrating element 16 becomes the same phase as that obtained at the time of resonance frequency measurement. In a case where the parts feeder is of a separately excited vibration type, a user sets a frequency at a prescribed value. In this case, an accurate control of the resonance frequency can also be performed by detecting the phases of the vibrating voltage of the piezoelectric vibrating element and the driving voltage.

It should be noted that the present invention is not limited to the embodiments as described above and any modifications thereof may be made. For instance, the operation idling period may be set suitably at any period so long as it does not substantially affect the driving of the parts feeder 10. Furthermore, the aforementioned control can be performed by current detection as well in the same way as the above method employing detection of the voltage obtained by the piezoelectric effect of the piezoelectric vibrating element 16. The present invention is applicable not only to the parts feeder having a bowl but also to any apparatus for supplying parts by using the piezoelectric vibrating element. The described embodiments are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

The disclosure in Japanese Patent Application No. 2000-244147 of Aug. 11, 2001 is incorporated here by reference. This Japanese Patent Application describes the invention described hereinabove and claimed in the claims appended hereinbelow and provides the basis for a claim of priority for the instant invention under 35 U.S.C. 119.

What is claimed is:

1. A method of controlling a piezoelectric vibratory parts feeder which comprises a piezoelectric vibrating unit provided with a piezoelectric vibrating element that vibrates at a predetermined frequency, a driving circuit for driving said piezoelectric vibrating element, and a control unit for outputting a driving signal to said driving circuit to cause a predetermined driving, comprising the steps of:

idling the driving of said piezoelectric vibrating element temporarily at every predetermined driving cycles of said piezoelectric vibrating element; and controlling vibration of said piezoelectric vibrating element based on a signal obtained from said piezoelectric vibrating element by its piezoelectric effect during a period of said idling.

2. The method set forth in claim 1, wherein said vibration of said piezoelectric vibrating element is controlled based on a phase difference between a waveform of said signal obtained from said piezoelectric vibrating element by its piezoelectric effect during said idling period and the driving signal of said driving circuit.

3. The method set forth in claim 2, wherein said controlling is performed by previously measuring a resonance frequency of said piezoelectric vibratory parts feeder, driving said piezoelectric vibrating element at said resonance frequency by said driving circuit, temporarily idling the driving by said driving circuit at every predetermined driving cycles, storing said phase difference between the waveform of said signal obtained from said piezoelectric vibrating element by its piezoelectric effect during said idling period and the driving signal of said driving circuit and said resonance frequency in a storage element, and driving said piezoelectric vibrating unit at the stored resonance frequency when it is driven.

4. The method set forth in claim 3, wherein measurement of said resonance frequency of said piezoelectric vibratory parts feeder is performed by driving said piezoelectric vibrating element by said driving circuit, idling the driving by said driving circuit temporarily at every predetermined driving cycles, measuring a signal obtained from said piezoelectric vibrating element by its piezoelectric effect during a period of said idling, and assuming a frequency at which said signal becomes maximum as said resonance frequency.

5. The method set forth in claim 3, wherein said piezoelectric vibrating unit is controlled in such a way that said phase difference between the waveform of the signal obtained by said piezoelectric effect and the driving signal of said driving circuit becomes equal to the stored phase difference.

6. The method set forth in claim 1, wherein said idling period is one cycle or 1.5 cycles of said driving cycles.

7. An apparatus for controlling a piezoelectric vibratory parts feeder, comprising:

- a piezoelectric vibrating unit provided with a piezoelectric vibrating element that vibrates at a predetermined frequency;
- a bowl adapted to discharge parts accommodated therein by means of said piezoelectric vibrating unit;
- a driving circuit for driving said piezoelectric vibrating element;
- a control unit for outputting a driving signal to said driving circuit to cause a predetermined driving and temporarily idling the driving of said piezoelectric vibrating element at every predetermined driving cycles of said piezoelectric vibrating element;
- a signal detecting means for detecting a waveform of a signal obtained from said piezoelectric vibrating element by its piezoelectric effect during a period of said idling;
- a phase difference detecting means for detecting a phase difference between the waveform of said signal obtained by said signal detecting means and a waveform of said driving signal of said driving circuit; and
- a vibration controlling means for controlling vibration of said piezoelectric vibrating element based on the phase difference obtained by said phase difference detecting means.

8. The apparatus set forth in claim 7, wherein said signal detecting means is a voltage detecting circuit.

9. The apparatus set forth in claim 7, wherein said control unit is provided with an amplitude setting circuit for adjusting an amplitude of said piezoelectric vibrating element through the medium of said driving circuit, a mode setting circuit for shifting the driving mode of said parts feeder from an adjustment mode to an operation mode and vice versa, and a nonvolatile memory for storing data.

* * * * *